United States Patent
Kresse et al.

(10) Patent No.: US 6,374,170 B1
(45) Date of Patent: Apr. 16, 2002

(54) CROSS-ADAPTIVE CONTROL METHOD FOR AN AUTOMATIC SHIFT TRANSMISSION

(75) Inventors: John P Kresse, Martinsville; Gregory A Hubbard, Carmel; Jeffrey Kurt Runde, Fishers, all of IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/693,174

(22) Filed: Oct. 23, 2000

(51) Int. Cl.$^7$ .............................................. B60K 41/06
(52) U.S. Cl. .............................. 701/51; 701/58; 701/60; 477/163; 477/154
(58) Field of Search ........................ 701/51, 58, 59, 701/53, 54, 64, 60, 62, 66; 477/163, 121, 158, 154

(56) References Cited

U.S. PATENT DOCUMENTS

| | | | |
|---|---|---|---|
| 4,070,927 A | 1/1978 | Polak | 475/286 |
| 4,653,350 A | 3/1987 | Downs et al. | 701/58 |
| 5,072,390 A | 12/1991 | Lentz et al. | 701/60 |
| 5,089,963 A * | 2/1992 | Takahashi | 706/23 |
| 5,099,428 A * | 3/1992 | Takahashi | 701/59 |
| 5,151,858 A | 9/1992 | Milunas et al. | 701/48 |
| 5,601,506 A | 2/1997 | Long et al. | 475/120 |
| 5,758,303 A * | 5/1998 | Sugiyama et al. | 701/53 |
| 5,812,957 A * | 9/1998 | Lizuka | 701/58 |

* cited by examiner

Primary Examiner—William A. Cuchlinski, Jr.
Assistant Examiner—Marthe Y. Marc-Coleman
(74) Attorney, Agent, or Firm—Leslie C. Hodges

(57) ABSTRACT

An improved automatic shift transmission control method establishes an initial methodology for sharing adaptive corrections among shift parameters stored for related types of shifts, and subsequently modifies the initial methodology as the adapted parameters converge on respective optimum values. Individual shift types are initially categorized to indicate the degree of cross-adaptive correction, and when shift parameter convergence occurs, the shift types are re-categorized, thereby modifying the initial cross-adaptive methodology to restrict further cross-adaptive correction. A given shift type is automatically reset to an initial or prior categorization to permit less restricted cross-adaptive correction if reset conditions are met. In this way, the methodology for sharing adaptive corrections automatically evolves to suit individual transmission operating characteristics and conditions, and effectively prevents degradation of a shift due to sharing of adaptive corrections developed for a related shift.

12 Claims, 4 Drawing Sheets

| RANGE \ CLUTCH | C1 | C2 | C3 | C4 | C5 |
|---|---|---|---|---|---|
| 1st | X | | | | X |
| 2nd | X | | | X | |
| 3rd | X | | X | | |
| 4th | X | X | | | |
| 5th | | X | X | | |
| 6th | | X | | X | |
| R | | | X | | X |
| N | | | | | X | mission (fill volume of a clutch, for example), or to clutch
CROSS-ADAPTIVE CONTROL METHOD FOR AN AUTOMATIC SHIFT TRANSMISSION

TECHNICAL FIELD

This invention relates to an automatic transmission shift control utilizing adaptive correction of calibrated shift parameters, and more particularly to a method of applying adaptive corrections for a given shift to the shift parameters of one or more related shifts.

BACKGROUND OF THE INVENTION

In general, a motor vehicle automatic transmission includes a number of gear elements and selectively engageable friction elements (referred to herein as clutches) that are controlled to selectively establish reverse or forward speed ratios between the transmission input and output shafts. Shifting from a currently established speed ratio to new speed ratio involves, in most cases, disengaging a clutch (off-going clutch) associated with the current speed ratio and engaging a clutch (on-coming clutch) associated with the new speed ratio.

Although transmission shift control algorithms utilize a variety of control strategies, most of them rely on a number of calibrated parameters for initiating clutch engagement and disengagement in the course of a shift. These parameters may pertain directly to physical characteristics of the transmission (fill volume of a clutch, for example), or to clutch pressure levels (on-coming or off-going) at specified points of the shift sequence. Although a shift can be calibrated in this manner to produce excellent shift quality under varying speed and load conditions in a new transmission, it is impractical to individually calibrate the control parameters for every transmission in a mass production environment. Moreover, it is known that the characteristics of any transmission vary somewhat with age and wear, producing a gradual degradation in shift quality if the parameters are not correspondingly adjusted. For these reasons, adaptive control strategies have been developed for automatically adjusting the calibrated parameters during operation of the transmission to achieve and maintain consistent high quality shifting in any given transmission. In general, this involves monitoring various transmission parameters during a shift to detect specified shift quality aberrations (such as engine flaring or clutch tie-up), and correcting one or more of the calibrated parameters upon completion of the shift so that the shift quality will be improved in the next shift of the same type. Thus, each shift type (1-2 upshift, for example) has its own set of calibrated parameters, and such parameters are subject to adaptive correction each time that shift occurs. Exemplary controls of this type are described in the U.S. Pat. Nos. 4,653,350 to Downs et al., and 5,072,390 to Lentz et al., both of which are assigned to the assignee of the present invention.

Adaptive correction strategies can become somewhat more complicated when the transmission controls are configured to provide different shift modes (Normal/Performance, or Normal/Towing, for example) since certain types of shifts may not occur until the transmission has been in service for a long time. This situation is addressed in the U.S. Pat. No. 5,151,858 to Milunas et al., also assigned to the assignee of the present invention, in the context of a control configured to selectively provide either Normal and Performance shift modes. Mode-specific adaptive correction tables are provided for each type of shift, with the Normal mode table being adjusted based only on Normal mode shifting, and the Performance mode table being adjusted based only on Performance mode shifting. In this scheme, Normal mode shifts utilize the Normal mode correction table, while Performance mode shifts utilize both the Normal mode correction table and the Performance mode correction table. This not only allows the Performance mode shift parameters to be adaptively adjusted based on a Normal mode shift of the same type, but also preserves a difference between Normal and Performance mode shifting.

The control described in the preceding paragraph may be regarded as a cross-adaptive control because adaptive corrections learned in the course of one type of shift (X-Y Normal mode shift) are utilized to adaptively correct corresponding parameters for different, but related, type of shift (X-Y Performance mode shift). However, the cross-adaptive learning described by Milunas et al. is relatively limited, and fails to recognize that the adaptive parameters for different types of shifts converge on respective optimum values at different rates, and that cross-adaptive controls that are appropriate when the transmission is relatively new may not be appropriate after the vehicle has been in service for some time. Accordingly, what is needed is a cross-adaptive control that maximizes the sharing of adaptive correction among related types of shifts, without negatively impacting shift quality as the adaptively corrected parameters converge on respective optimum values.

SUMMARY OF THE INVENTION

The present invention is directed to an improved cross-adaptive control method for automatic shift transmissions in which an initial methodology for sharing adaptive corrections is automatically modified as the adapted parameters for various related types of shifts converge on respective optimum values. Individual shift types in a grouping or sub-grouping of related shifts are initially categorized to indicate the degree of cross-adaptive correction sharing. When shift parameter convergence for a given shift occurs, that shift is re-categorized, thereby modifying the initial cross-adaptive methodology to restrict further cross-adaptive correction. Additionally, an adaptive parameter for a given shift type may be re-categorized to permit further cross-adaptive correction if the shift has not been performed for a prolonged period and the corresponding parameter of a related shift has been adjusted by at least a predetermined amount since the last cross-adaptive correction occurred. In this way, the cross-adaptive methodology automatically evolves to suit individual transmission operating characteristics and conditions, and effectively prevents a situation where adaptive corrections developed for one shift degrade the shift quality of a related shift.

In a preferred mechanization, a non-volatile data array is used to efficiently store shift grouping, categorization and convergence data for each shift type subject to cross-adaptive control. This reduces the complexity of the cross-adaptive control software and facilitates factory calibration and subsequent dealer resetting if required.

DESCRIPTION OF THE PREFERRED EMBODIMENT

The control of this invention is described in the context of a multi-ratio power transmission having a planetary gearset of the type described in the U.S. Pat. No. 4,070,927 to Polak, and having an electro-hydraulic control of the type described in U.S. Pat. No. 5,601,506 to Long et al. Accordingly, the gearset and control elements shown in FIG. 1 hereof have been greatly simplified, it being understood that further information regarding the fluid pressure routings and so on may be found in the aforementioned patents.

Figures 1, 2:
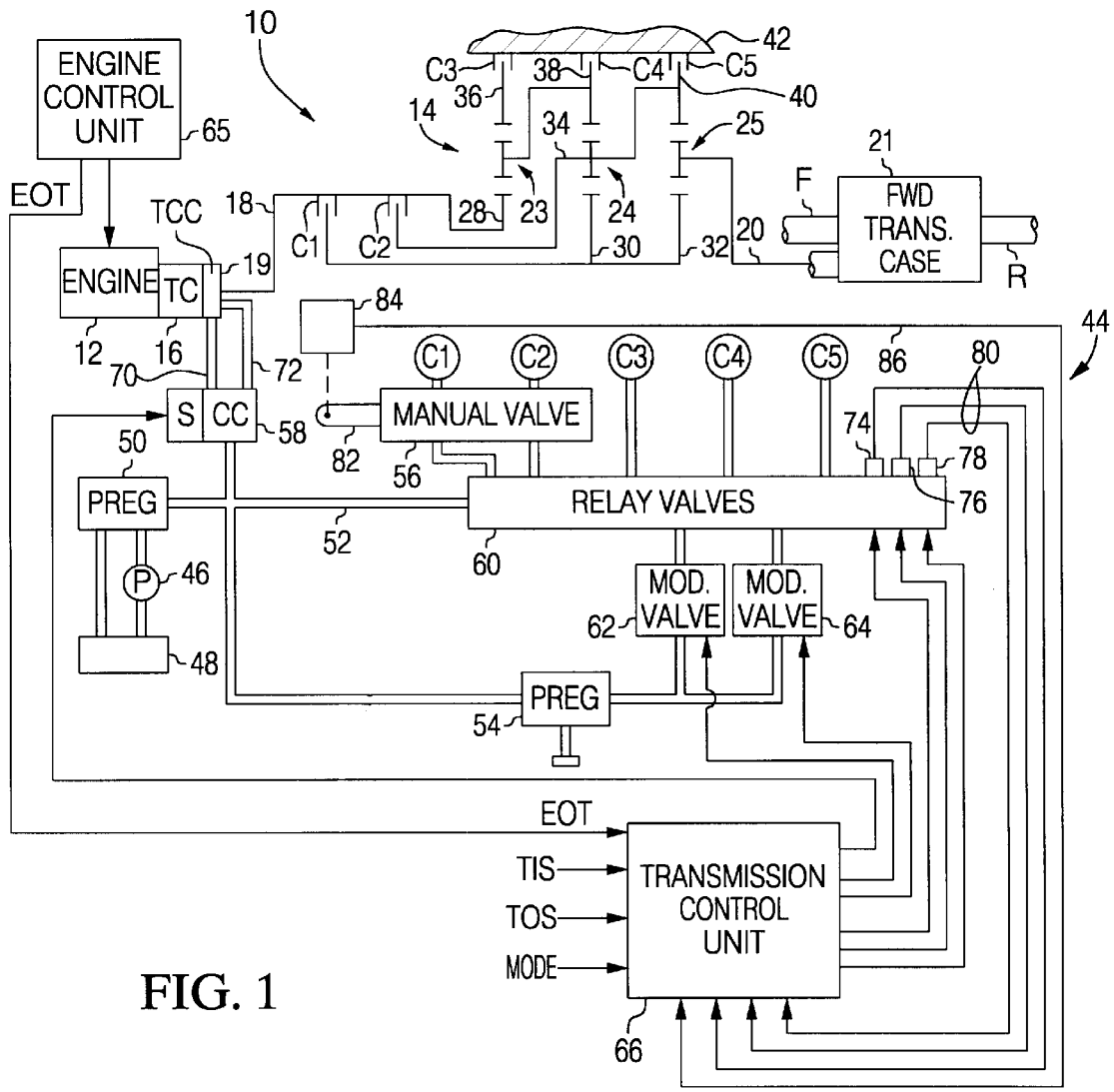
FIG. 1 is a diagram of an automatic shift transmission and a microprocessor-based control unit for carrying out the control of this invention.
FIG. 2 is a table indicating a relationship between transmission clutch activation and corresponding speed ratio.

Referring to FIG. 1, the reference numeral 10 generally designates a vehicle powertrain including engine 12, transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gearsets, designated generally by the reference numerals 23, 24 and 25. The input shaft 18 continuously drives a sun gear 28 of gearset 23, selectively drives the sun gears 30, 32 of gearsets 24, 25 via clutch C1, and selectively drives the carrier 34 of gearset 24 via clutch C2. The ring gears 36, 38, 40 of gearsets 23, 24, 25 are selectively connected to ground 42 via clutches C3, C4 and C5, respectively.

As diagrammed in FIG. 2, the state of the clutches C1–C5 (i.e., engaged or disengaged) can be controlled to provide six forward speed ratios (1, 2, 3, 4, 5, 6), a reverse speed ratio (R) or a neutral condition (N). For example, the second forward speed ratio is established when clutches C1 and C4 are engaged. Shifting from one speed forward speed ratio to another is generally achieved by disengaging one clutch (referred to as the off-going clutch) while engaging another clutch (referred to as the on-coming clutch). For example the transmission 14 is downshifted from second to first by disengaging clutch C4 while engaging clutch C5.

The torque converter clutch 19 and the transmission clutches C1–C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid operated fluid control valves 58–64.

The electronic portion of the control is primarily embodied in the engine control unit 65 and the transmission control unit 66, illustrated in FIG. 1 as two separate modules. Both control units 65, 66 are microprocessor-based, and may be conventional in architecture. The engine control unit 65 controls the operation of engine functions such as fuel, spark timing, and so on, in response to various inputs including the driver torque request, and the transmission control unit 66 controls the solenoid operated fluid control valves 58–64 based on a number of inputs to achieve a desired transmission speed ratio. The transmission control unit inputs include signals representing the transmission input speed TIS, transmission output speed TOS, engine output torque EOT, and desired shifting mode (MODE). Sensors for developing speed signals TIS and TOS may be conventional in nature (and have been omitted for simplicity), whereas the EOT signal is received from engine control unit 65. The MODE signal indicates a shift mode desired by the operator of the vehicle, and in the illustrated embodiment, the operator selects either a normal (N) shift mode designed for normal load conditions, or a towing (T) shift mode designed for heavy loading conditions. In general, individual shifts occur at higher engine speeds and with higher clutch pressures in the towing mode than in the normal mode.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, the fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid operated fluid control valves 58–64 are generally characterized as being either of the on/off or modulated type. To reduce cost, the electro-hydraulic control system 44 is configured to minimize the number of modulated fluid control valves, as modulated valves are generally more expensive to implement. To this end, a set of three on/off relay valves, shown in FIG. 1 as a consolidated block 60, are utilized in concert with manual valve 56 to enable controlled engagement and disengagement of each of the clutches C1–C5 with only two modulated valves 62, 64. For any selected ratio, the control unit 66 activates a particular combination of relay valves 60 for coupling one of the modulated valves 62, 64 to the on-coming clutch, and the other modulated valve 62, 64 to the off-going clutch.

The modulated valves 62, 64 each comprise a conventional pressure regulator valve biased by a variable pilot pressure that is developed by current controlled force motor. The fluid controlled valve 58 is also a modulated valve, and controls the fluid supply path to converter clutch 19 in lines 70, 72 for selectively engaging and disengaging the converter clutch 19. The transmission control unit 66 determines pressure commands for engaging and/or disengaging the respective clutches C1–C5, develops corresponding force motor current commands, and then supplies current to the respective force motors in accordance with the current commands.

As indicated above, the pressure commands developed by transmission control unit 66 for the on-coming and off-going clutches associated with any given shift are determined in part based on a number of calibrated parameters subject to adaptive correction. For example, in the aforementioned U.S. Pat. No. 5,072,390 to Lentz et al., incorporated herein by reference, parameters relating to on-coming clutch fill time, initial on-coming pressure, and initial off-going clutch pressure are adaptively adjusted for each type of upshift. In a conventional approach, the adaptable parameters for each shift type are adjusted based on corrections developed specifically for that shift type—in other words, without sharing of adaptive corrections between different types of shifts. In contrast, the present invention is directed to a cross-adaptive control in which adaptive corrections developed for one type of shift are used to adaptively correct corresponding parameters for a related type of shift. For example, it can be seen by referring to FIG. 2 that clutch C3 is the on-coming clutch for a 2-3 upshift as well as a 4-5 upshift. Thus, adaptive corrections to the fill time (or fill volume) and initial clutch pressures developed in the course of a 2-3 upshift can also be applied to the corresponding parameters for the 4-5 upshift, and vice-versa. Moreover, it is advantageous to extend such sharing of adaptive corrections to shifts performed in Normal and Towing modes. This concept is schematically depicted in FIG. 3A, where the four circles represent four related upshifts (2-3 Normal, 2-3 Towing, 4-5 Normal, 4-5 Towing), and the bi-directional arrows coupling the circles indicate that adaptive corrections developed for any of the four shift types can be applied to the corresponding parameters of the other three shift types.

Figure 3A:
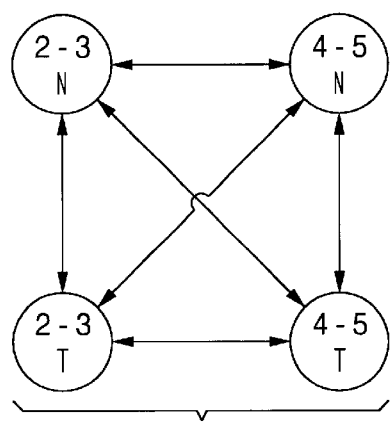
FIGS. 3A, 3B and 3C are schematic diagrams of initial cross-adaptive control methodologies according to this invention.
Figure 3B:
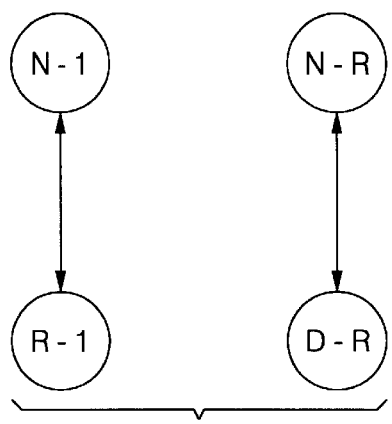
Figure 3C:
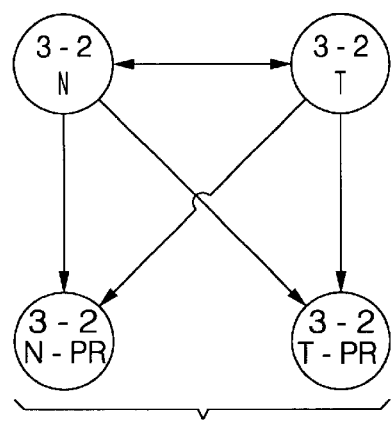

A similar logic can be extended to garage shifts involving a common on-coming clutch as shown in FIG. 3B, and to closed-throttle downshifts involving a common on-coming clutch as shown in FIG. 3C. In the case of garage shifts, N-1 and R-1 shifts both involve clutch C1 as the on-coming clutch, whereas N-R and D-R shifts both involve clutch C3 as the on-coming clutch. Thus, adaptive corrections developed for N-1 shifts or R-1 shifts are applied to the other related shift, and adaptive corrections developed for N-R or D-R shifts are applied to the other related shift. In the case of closed-throttle downshifts, any given shift can be performed one of four ways depending on shift mode (Normal or Towing) and whether the shift is a normally scheduled downshift or an operator-initiated (pre-select) downshift. Here, adaptive corrections developed for a normally scheduled shift (3-2 Normal or 3-2 Towing) are applied to each of the other three shift types, but adaptive corrections developed for an operator-initiated (pre-select) shift are not shared.

The present invention additionally recognizes that although a high degree of cross-adaptive control may be appropriate initially, a more restrictive degree of cross-adaptive control will be appropriate as the adaptable parameters for the various related shift types converge on respective optimum values. Accordingly, the present invention provides a control in which an initial methodology for sharing adaptive corrections is automatically modified as the adapted parameters for various related types of shifts converge on respective optimum values. In general, the initial cross-adaptive methodology is maintained until it is determined that the adaptable parameters for either the current shift (i.e., the teacher) or a related shift (i.e., the student) have converged. The convergence of a given adaptive parameter may be detected, for example, when a current adaptive correction changes the parameter in a direction opposite to the most recent adaptive correction. In most cases, the methodology is then modified to prevent further cross-adaptive correction of that parameter, as between the identified teacher and student. A similar result occurs if a cross-adaptive correction contradicts a prior adaptive correction specifically developed for a given shift; in this case further cross-adaptive correction of the given (student) shift parameter is discontinued. In a very limited application of cross-adaptive control, cross-adaptive correction is only used in shifts that have not yet occurred; in this case, a given shift type is re-categorized to prevent further cross-adaptive correction as soon as the shift occurs.

Figure 4A:
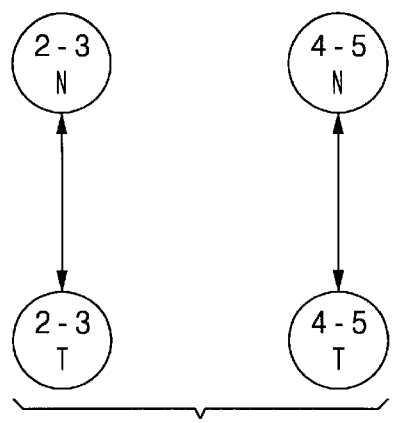
FIGS. 4A and 4B are schematic diagrams of modified cross-adaptive control methodologies according to this invention.
Figure 4B:
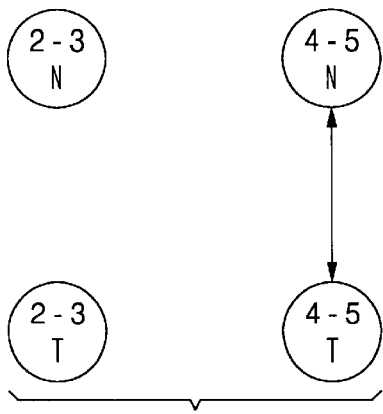

An example of successive modification of the cross-adaptive methodology for fill volume in the related 2-3 and 4-5 upshifts is schematically depicted in FIGS. 3A, 4A and 4B. As indicated above, FIG. 3A depicts an initial cross-adaptive control methodology in which adaptive corrections developed for any of the four shift types (2-3 Normal, 2-3 Tow, 4-5 Normal, 4-5 Tow) can be applied to the corresponding parameters of the other three shift types. In other words, if the control unit 66 develops an adaptive correction for the fill volume of on-coming clutch C3 in the course of performing a 2-3 Normal mode shift, the correction is applied to the stored fill volume parameters for each of the 2-3 Normal, 2-3 Tow, 4-5 Normal, and 4-5 Tow shift types. Thus, all of the shift types may be a cross-adaptive teacher or a cross-adaptive student; in this case, each adaptive parameter for each shift type is categorized as a "peer". Nevertheless, it is recognized that there is a closer link between 2-3 Normal and 2-3 Tow, and between 4-5 Normal and 4-5 Tow, than between a 2-3 shift (Normal or Tow mode) and a 4-5 shift (Normal or Tow mode). For this reason, the illustrated shift type grouping is considered as comprising a 2-3 shift subgroup (2-3 Normal and 2-3 Tow) and a 4-5 shift subgroup (4-5 Normal and 4-5 Tow). Although the initial methodology makes no distinction between the subgroups, as indicated in FIG. 3A, FIG. 4A depicts a modification to the initial methodology in which further cross-adaptive control between the two subgroups is prohibited. Thus, referring to FIG. 4A, the 2-3 shifts are categorized as subgroup peers, as are the 4-5 shifts, and there is no cross-adaptive adaptive control between the 2-3 shifts and the 4-5 shifts. This means, for example, that adaptive fill volume corrections developed in the course of a 2-3 Normal mode shift are applied to the fill volume parameter for both 2-3 shifts, but not to the fill volume parameters of either of the 4-5 shifts. The modification depicted in FIG. 4A occurs if an adaptive parameter developed in the course of one subgroup shift results in a detected convergence of the corresponding parameter for another subgroup shift—that is, if an adaptive parameter of a student shift associated with one subgroup is deemed to have converged due to application of a cross-adaptive correction developed for a parent shift of a different subgroup. In other words, the initial fill volume cross-adaptive methodology of FIG. 3A is modified as shown in FIG. 4A if, for example, a fill volume correction developed in the course of a 2-3 shift (Normal or Tow) and applied to the 4-5 shifts results in a detected convergence of the 4-5 Normal mode fill volume or the 4-5 Tow mode fill volume. FIG. 4B represents a further modification of the cross-adaptive methodology that occurs if the fill volume of one of the 2-3 shifts is deemed to have converged; in this case, both 2-3 shifts are categorized as "independent", meaning that further cross-adaptive control (either as a student or a teacher) is prohibited. A similar modification could also occur, of course, with respect to the 4-5 shifts. Also, it is possible to transition directly from the initial methodology of FIG. 3A to that of FIG. 4B if, for example, a fill volume correction developed in the course of a 2-3 shift (Normal or Tow) and applied to the other 2-3 shift results in a detected convergence of the other 2-3 shift fill volume parameter.

The present invention also provides a mechanism for automatically resetting the cross-adaptive methodology to the initial methodology to reinstate cross-adaptive control if conditions indicative of a significant change in operation (i.e., either due to wear or newly installed transmission parts) are detected. In particular, the methodology is reset if a given shift is not performed for a prolonged period after cross-adaptive control is prohibited, and the adaptive parameter of the prospective teaching shift has changed by at least a specified amount. Also, the cross-adaptive methodology may be manually reset, as explained below.

In a preferred mechanization of the present invention, non-volatile data arrays are used to efficiently characterize the current cross-adaptive methodology, as well as to store convergence data for each parameter subject to cross-adaptive control. In particular, a non-volatile data word is associated with each type of shift subject to cross-adaptive control, and the data words are stored in arrays that represent the shift groups and subgroups. The individual bits of the data words store information regarding, for example, the last teacher for each of a number of shift parameters, convergence data for the various parameters, and the cross-adaptive category (i.e., peer, independent, etc.) for the various parameters. Exemplary data arrays corresponding to the various 2-3/4-5 upshift cross-adaptive control methodologies described above are illustrated in FIGS. 5A–5D for the following adaptive parameters: on-coming clutch fill volume (Fill volume), initial on-coming clutch pressure (Ponc), and initial off-going clutch pressure (Pofg). In the illustration, each word comprises 15 bits, with the following bit definitions:

Bits 0/1 (Last teacher): 00=row 1, 01=row 2, 10=row 3, 11=row 4.

Bits 2/3 (Fill volume state): 00=stop learning on first shift, 01=decreasing, 10=increasing, 11=neutral.

Bit 4 (Shift since key-on): 0=no, 1=yes.

Bits 5/6 (Fill volume category): 00=off, 01=subgroup peer, 10=peer, 11=independent.

Bits 7/8 (Ponc state): 00=stop learning on first shift, 01=decreasing, 10=increasing, 11=neutral.

Bits 9/10 (Ponc category): 00=off, 01=subgroup peer, 10=peer, 11=independent.

Bits 11/12 (Pofg state): 00=stop learning on first shift, 01=decreasing, 10=increasing, 11=neutral.

Bits 13/14 (Pofg category): 00=off, 01=subgroup peer, 10=peer, 11=independent.

Figure 5A:
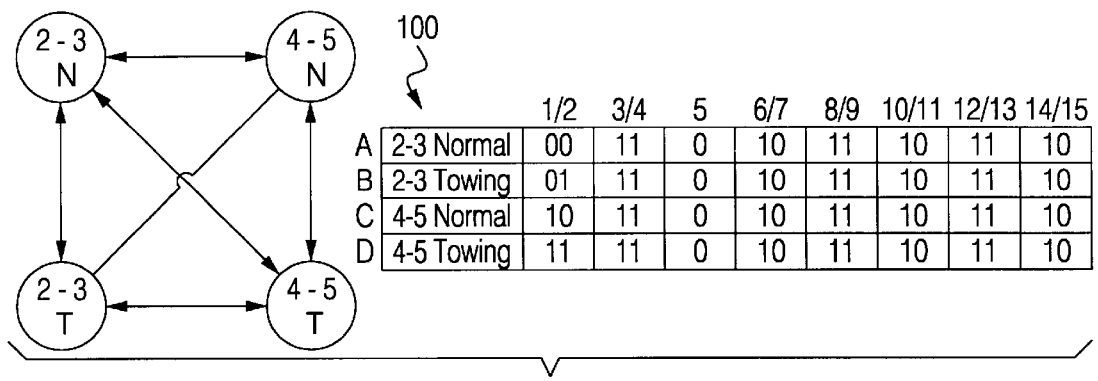
FIGS. 5A, 5B, 5C and 5D are schematic diagrams and corresponding data arrays depicting initial and modified cross-adaptive control methodologies according to this invention.

Referring to FIGS. 5A–5D, the 2-3/4-5 cross-adaptive upshift grouping is represented by the four data words A, B, C, D, which together form an array 100. The initial cross-adaptive methodology and the corresponding data array are shown in FIG. 5A. As illustrated, bits 1/2 are initialized to reflect only self-teaching (i.e., no cross-adaptive). Otherwise, the data words are identical for each type of shift, reflecting the initial cross-adaptive methodology in which all four shift types are regarded as peers with no subgroup distinctions, and neutral states of the various adaptive parameters.

Figure 5B:
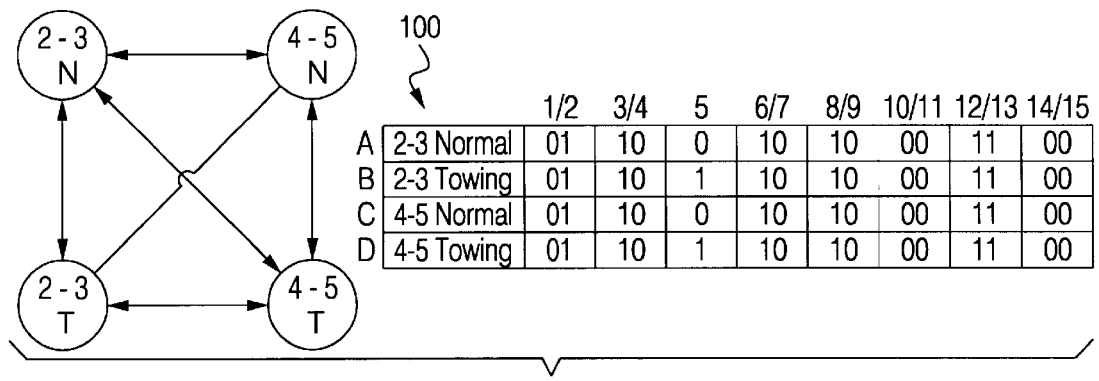

FIG. 5B illustrates the array 10 after the vehicle has been operated for a period of time, but before any modification of the cross-adaptive methodology occurs; for purposes of the illustration, it is assumed that only the Towing mode is used, and that adaptive fill volume corrections are developed during the course of 2-3 Towing mode shifts. Accordingly, the array indicates that: (1) the last teacher is the 2-3 Towing shift; (2) the fill volume parameters have been adaptively increased; (3) only Towing mode shifts have occurred; (4) the various shifts are all categorized as peers for purposes of cross-adapting fill volume; and (5) no adaptive corrections have been made in respect to on-coming or off-going pressure parameters.

Figure 5C:
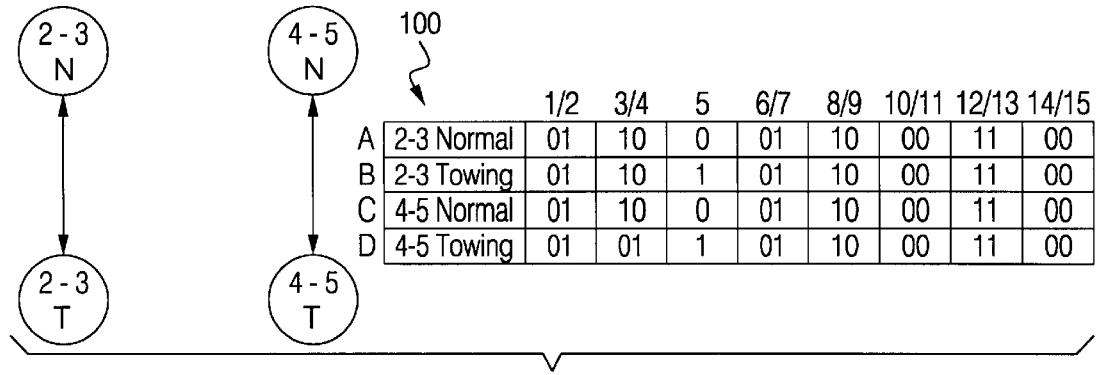

FIG. 5C illustrates a first modification to the cross-adaptive methodology due to a detected convergence of the fill volume parameter for the 4-5 Towing mode shift based on an adaptive correction developed in the course of a 2-3 Towing mode shift. The convergence is indicated by a change in the direction of adaptive correction, and is reflected in bits 3/4 of data word D, which indicate an adaptive decrease instead of an increase. Accordingly, bits 6/7 indicate that each of the shift types (2-3 Normal, 2-3 Towing, 4-5 Normal, 4-5 Towing) is now categorized as a subgroup peer. So long as the vehicle continues to operate in the Towing mode, the only teacher for the 2-3 Normal adaptive parameters is the 4-5 Towing mode shift, and the only teacher for the 4-5 Normal mode adaptive parameters is the 4-5 Towing mode shift.

Figure 5D:
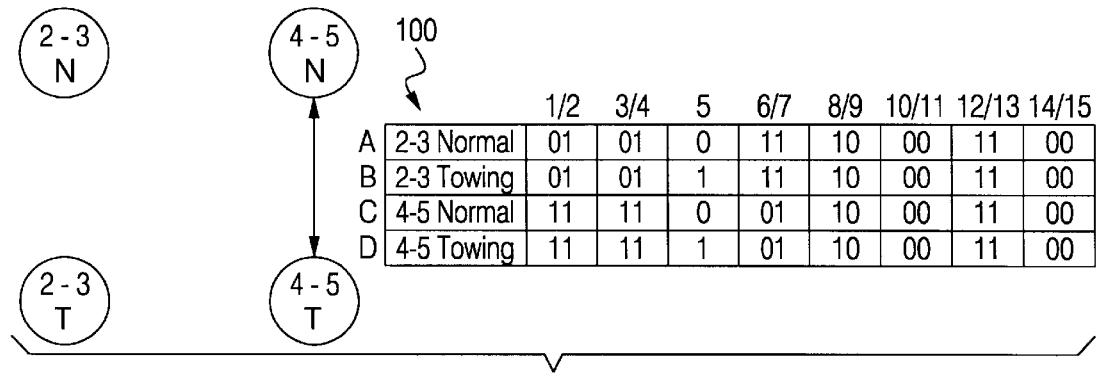

FIG. 5D illustrates a second modification to the cross-adaptive methodology due to a detected convergence of the fill volume parameters for the 2-3 Normal and Towing mode shifts. The convergence is indicated by a change in the direction of adaptive correction, and is reflected in bits 3/4 of data words A and B, which indicate an adaptive decrease instead of an increase. Accordingly, bits 6/7 indicate that the 2-3 Normal and 2-3 Towing shifts are now categorized as Independent shifts, while the 4-5 Normal and 4-5 Towing shifts remain categorized as subgroup peer shifts.

Figure 6:
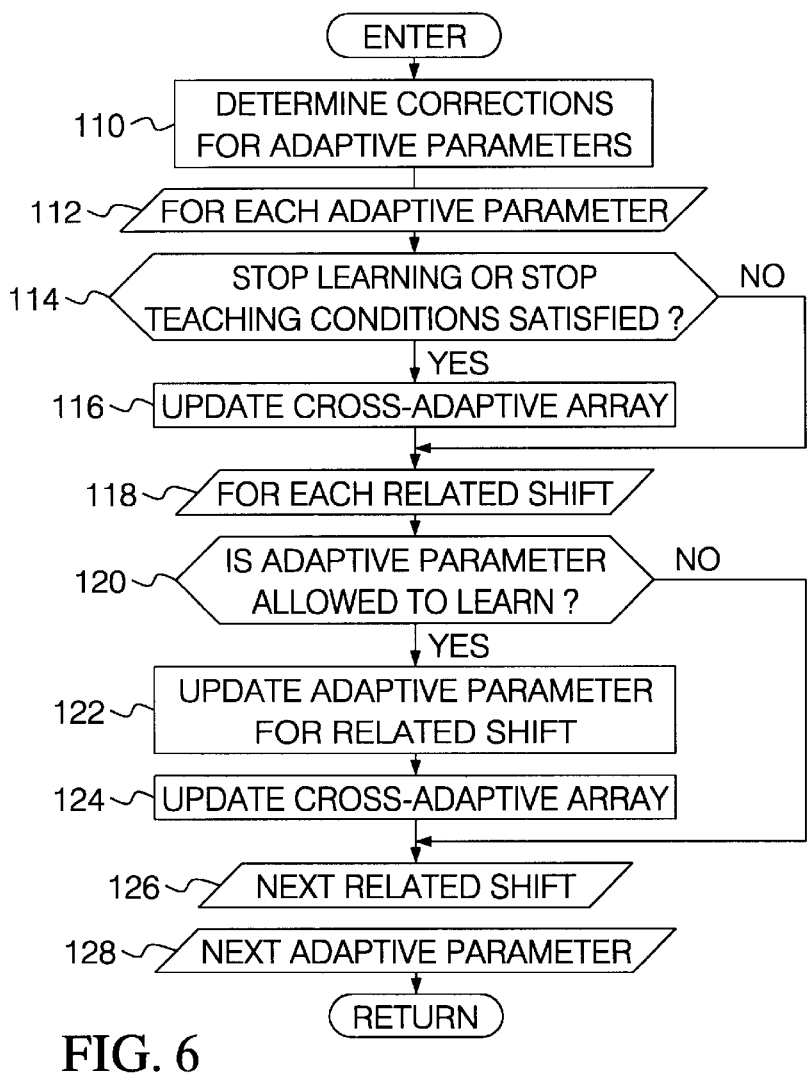
FIG. 6 is a flow diagram of a cross-adaptive control methodology carried out by the control unit of FIG. 1 according to this invention.

FIG. 6 is a flow diagram representative of relatively high level computer program instructions executed by the transmission control unit 66 upon completion of each transmission shift. The block 110 is first executed to determine corrections for each of the adaptive parameters for the just completed shift, to correspondingly correct the adaptive parameters, and to update the array data for that shift. For each such adaptive parameter, the instruction and decision blocks intermediate the "FOR" and "NEXT" blocks 112 and 128 are then executed to carry out a cross-adaptive control for applying the respective correction to the corresponding parameter of related shift types. Initially, the blocks 114 and 116 are executed to update the array if it is determined that the parameter category for the current shifts or any related shifts should be changed. In particular, block 114 determines if any "STOP LEARNING" or "STOP TEACHING" conditions are satisfied. In most applications, this will involve determining if the respective parameter for the completed shift or any prospective student shift has converged (as signified by a directional change in the adaptive correction). Depending on the cross-adaptive strategy implemented, one or more shifts may need to be re-categorized as subgroup peer, or independent, as explained above, and in such case, block 116 is executed to correspondingly update the cross-adaptive array. The blocks 120–124 are then executed for each related shift, as indicated by the "FOR" and "NEXT" blocks 118 and 126. Block 120 scans the parameter category bits of the cross-adaptive array to determine if the adaptive parameter for the respective related shift should be updated based on the correction learned for the current shift. If so, the blocks 122 and 124 are executed to update the corresponding parameter and to update the "last teacher" and parameter "state" bits of the cross-adaptive array; otherwise, the blocks 122 and 124 are skipped, as indicated. The routine is completed when the above-described steps have been executed for each adaptive parameter.

Figure 7:
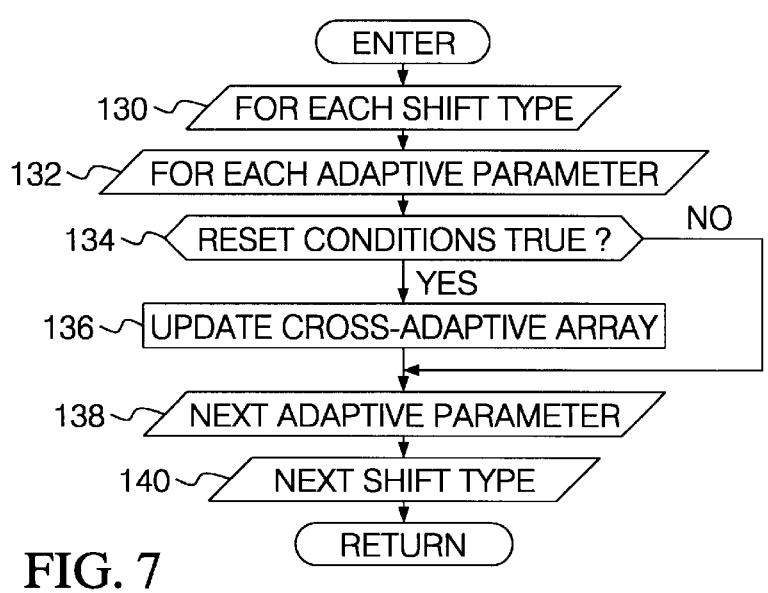
FIG. 7 is a flow diagram of a cross-adaptive reset control carried out by the control unit of FIG. 1 according to this invention.

FIG. 7 is a flow diagram representative of relatively high level computer program instructions executed by the transmission control unit 66 just prior to each power-down of the control unit 66 to determine if the cross-adaptive category of any adaptive parameter for any shift type should be reset. Thus, the blocks 134 and 136 are executed for each adaptive parameter of each shift type, as indicted by the nested "FOR" and "NEXT" blocks 130, 132, 138, 140. In general, as explained above, an adaptive parameter for a given shift type may be re-categorized to authorize an increased degree of cross-adaptive correction if the shift has not been performed for a prolonged period (which may be gauged in terms of the number of shifts which have occurred) and the corresponding parameter of a related shift has been adjusted by at least a predetermined amount since the last cross-adaptive correction occurred. If block 134 determines that the reset conditions are satisfied, the block 136 updates the respective parameter "state" bits of the cross-adaptive array. Alternatively, or in addition to the above-described routine, the category of any adaptive parameter may be manually reset by simply modifying the "state" bits of the cross-adaptive array with a suitable service tool; this may be desired, for example, when various components of the transmission have been replaced or repaired.

In summary, present invention provides a cross-adaptive control in which an initial methodology for sharing adaptive corrections is automatically modified as the adapted parameters for various related types of shifts converge on respective optimum values. In this way, the methodology for sharing adaptive corrections automatically evolves to suit individual transmission operating characteristics and conditions, and effectively prevents a situation where sharing of adaptive corrections developed for one shift negatively impacts the shift quality of a another shift.

While this invention has been described in reference to the illustrated embodiment, it will be understood that a number of modifications and variations in addition to those mentioned above will occur to those skilled in the art. Accordingly, it will be understood that control methods incorporating these and other modifications may fall within the scope of this invention, which is defined by the appended claims.

What is claimed is:

1. A method of operation for an automatic shift transmission that performs different types of shifts, wherein each shift is performed as a function of parameters stored for that shift, and an adaptive correction value learned during a given type of shift is applied to a parameter stored for that type of shift, the method of operation comprising the steps of:

establishing an initial methodology for applying said adaptive correction value to parameters stored for one or more types of shifts other than said given type of shift;

maintaining a record of adaptive corrections applied to each of said parameters to detect a convergence of a parameter on an optimum value; and when said convergence is detected, modifying said initial methodology so as to restrict further application of said adaptive correction value to the parameters of said one or more types of shifts.

2. The method of operation of claim 1, including the steps of:

recording a polarity of the adaptive correction applied to each parameter; and detecting convergence of a parameter when a newly learned adaptive correction value has a polarity opposite to the recorded polarity for that parameter.

3. The method of operation of claim 1, including the step of:

detecting convergence of a parameter stored for a given shift on a first performance of that shift.

4. The method of operation of claim 1, wherein said given type of shift is performed in a shifting mode selected from among a plurality of different shifting modes, parameters for said given type of shift are individually stored for each of said plurality of different shifting modes, and the initial methodology applies said adaptive correction value to each of said individually stored parameters.

5. The method of operation of claim 4, wherein the step of modifying said initial methodology includes the step of:

discontinuing application of said adaptive correction value to a parameter stored for a given shifting mode when application of said adaptive correction value results in convergence of the parameter stored for said given shifting mode.

6. The method of operation of claim 1, wherein said given type of shift is one type of shift and said transmission has at least one other type of shift that is related to said one type of shift, the method of operation including the steps of:

establishing an initial methodology for applying said adaptive correction value to the parameters stored for both said given type of shift and said other types of shifts; and discontinuing application of said adaptive correction value to parameters stored for said other types of shifts when application of said adaptive correction value results in convergence of the parameter stored for such other types of shifts.

7. The method of operation of claim 1, wherein said transmission has at least one other type of shift that is related to said given type of shift, where both of said shift types can be performed in a shifting mode selected from among two more different shifting modes, and wherein parameters for the different types of shifts are individually stored for each of said shifting modes, the method of operation including the step of:

establishing an initial methodology for applying said adaptive correction value to each of said individually stored parameters.

8. The method of operation of claim 7, wherein the step of modifying said initial methodology includes the steps of:

discontinuing application of said adaptive correction value to parameters stored for said other type of shift when application of said adaptive correction value results in convergence of the parameter stored for such other type of shift.

9. The method of operation of claim 7, wherein the step of modifying said initial methodology includes the steps of:

discontinuing application of said adaptive correction value to a parameter stored for a given shifting mode when application of said adaptive correction value results in convergence of the parameter stored for said given shifting mode.

10. The method of operation of claim 1, including the step of: re-establishing said initial methodology following modification of said initial methodology so as to reinitiate application of said adaptive correction value to said one or more types of shifts in response to detection of a specified change in operation of said transmission.

11. The method of operation of claim 10, including the step of:

detecting said specified change in operation of said transmission if said one or more types of shifts have not occurred for a specified period, and the parameter stored for said given type of shift has changed by at least a specified amount.

12. The method of operation of claim 11, wherein said specified period is defined by performance of said given type of shift a specified number of times.

* * * * *